US008295235B2

(12) United States Patent
Varma et al.

(10) Patent No.: US 8,295,235 B2
(45) Date of Patent: Oct. 23, 2012

(54) LOAD BALANCING MULTIPLE AMONG MULTIPLE CARRIERS IN A SECTOR

(75) Inventors: Subir Varma, San Jose, CA (US); Saied Kazeminejad, Ashburn, VA (US)

(73) Assignee: Clearwire IP Holdings LLC, Bellevue, WA (US)

( * ) Notice: Subject to any disclaimer, the term of this patent is extended or adjusted under 35 U.S.C. 154(b) by 894 days.

(21) Appl. No.: 12/403,542

(22) Filed: Mar. 13, 2009

(65) Prior Publication Data
US 2010/0232390 A1   Sep. 16, 2010

(51) Int. Cl.
*H04W 4/00* (2009.01)
(52) U.S. Cl. ............... 370/329; 370/437; 455/452.1; 455/453
(58) Field of Classification Search .............. None
See application file for complete search history.

(56) References Cited

U.S. PATENT DOCUMENTS

| 6,035,208 | A | * | 3/2000 | Osawa | 455/522 |
| 7,466,981 | B1 | * | 12/2008 | Abdelhamid et al. | 455/438 |
| 8,180,357 | B2 | * | 5/2012 | Khanka et al. | 455/451 |
| 2006/0166677 | A1 | * | 7/2006 | Derakshan et al. | 455/453 |
| 2007/0189320 | A1 | | 8/2007 | Wu et al. | |

* cited by examiner

*Primary Examiner* — Bob Phunkulh
*Assistant Examiner* — Srinivasa Reddivalam
(74) *Attorney, Agent, or Firm* — O'Brien Jones, PLLC (57) ABSTRACT

A method of operating a communication system is disclosed. A first set of wireless devices is communicated with using a first frequency range. A second set of wireless devices is communicated with using a second frequency range. A first air-interface utilization associated with the first frequency range is determined. The first air-interface utilization is determined to satisfy a criteria. A second air-interface utilization associated with the second frequency range is determined. A subset of the first set of wireless devices is selected. The subset is selected to have a total air interface utilization that exceeds one-half of the difference between the first air-interface utilization and the second air-interface utilization. The subset of wireless devices is controlled to use the second frequency range.

15 Claims, 5 Drawing Sheets

LOAD BALANCING MULTIPLE AMONG MULTIPLE CARRIERS IN A SECTOR

TECHNICAL BACKGROUND

Wireless communication may be used as a means of accessing a network. Wireless communication has certain advantages over wired communications for accessing a network. One of those advantages is a lower cost of infrastructure to provide access to many separate locations or addresses compared to wired communications. This is the so-called "last mile" problem. Another advantage is mobility. Wireless communication devices, such as cell phones, are not tied by wires to a fixed location. To use wireless communication to access a network, a customer needs to have at least one transceiver in active communication with another transceiver that is connected to the network.

To facilitate wireless communications, the Institute of Electrical and Electronics Engineers (IEEE) has promulgated a number of wireless standards. These include the 802.11 (WiFi) standards and the 802.16 (WiMAX) standards. Likewise, the International Telecommunication Union (ITU) has promulgated standards to facilitate wireless communications. This includes TIA-856, which is also known as Evolution-Data Optimized (EV-DO). The European Telecommunications Standards Institute (ETSI) has also promulgated a standard known as long term evolution (LTE). Additional standards such as the fourth generation communication system (4G) are also being pursued. These standards pursue the aim of providing a comprehensive IP solution where voice, data, and streamed multimedia can be given to users on an "anytime, anywhere" basis. These standards also aim to provide higher data rates than previous generations. All of these standards may include specifications for various aspects of wireless communication with a network. These aspects include processes for registering on the network, carrier modulation, frequency bands of operation, and message formats.

Overview

A method of operating a communication system is disclosed. A first set of wireless devices is communicated with using a first frequency range. A second set of wireless devices is communicated with using a second frequency range. A first air-interface utilization associated with the first frequency range is determined. The first air-interface utilization is determined to satisfy a criteria. A second air-interface utilization associated with the second frequency range is determined. A subset of the first set of wireless devices is selected. The subset is selected to have a total air interface utilization that exceeds one-half of the difference between the first air-interface utilization and the second air-interface utilization. The subset of wireless devices is controlled to use the second frequency range.

A first average air-interface utilization associated with a first channel is determined. The first average air-interface utilization is determined to satisfy a criteria. Based on the first average air-interface utilization satisfying the criteria, a set of wireless devices is transferred from the first channel to a second channel. The set of wireless devices transferred is selected such that the average air-interface utilization due to the set of wireless devices transferred is greater than one-half of the difference between the first average air-interface utilization and a second average air-interface utilization associated with the second channel.

DETAILED DESCRIPTION

In an embodiment, a base station has at least two channels it can use to communicate with wireless devices. An average air-interface utilization (e.g., slot utilization) is calculated for each channel. When the average air-interface utilization exceeds a threshold for any given channel, the base station selects a set of wireless devices to move from a busy channel to a less busy channel.

The wireless devices are selected such that the average air-interface utilization due to the selected wireless devices is greater than one-half of the difference between the average air-interface utilization on the first channel and the average air-interface utilization on the second channel. Over time, this results in the air-interface utilization of the two channels converging to the average of the two air-interface utilizations.

Figure 1:
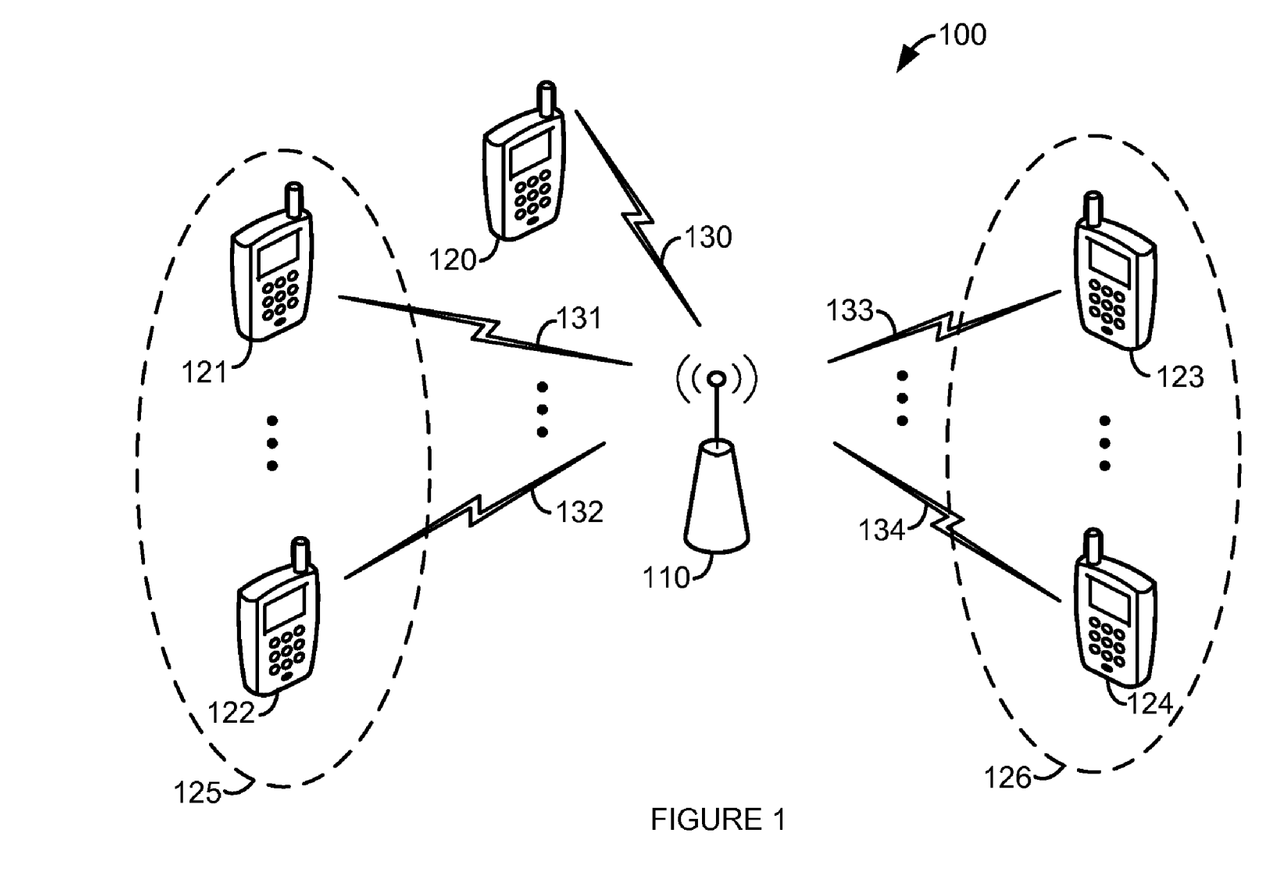
FIG. 1 is a block diagram illustrating a communication system.

FIG. 1 is a block diagram illustrating a communication system. In FIG. 1, communication system 100 comprises: base station 110; requesting device 120; first plurality of wireless devices 125, and second plurality of wireless devices 126. The first plurality of wireless devices 125 is shown in FIG. 1 as comprising wireless device 121 and wireless device 122. First plurality of wireless devices 125 may comprise more than two wireless devices. However, these additional wireless devices have been omitted from FIG. 1 for the sake of brevity. The second plurality of wireless devices 126 is shown in FIG. 1 as comprising wireless device 123 and wireless device 124. Second plurality of wireless devices 126 may comprise more than two wireless devices. However, these additional wireless devices have been omitted from FIG. 1 for the sake of brevity.

Requesting device 120 is operatively coupled to base station 110 via wireless link 130. Wireless devices 121-124 are operatively coupled to base station 110 via wireless link 131-134, respectively. Additional wireless links may operatively couple wireless devices included, but not shown, in the first plurality of wireless devices 125 and the second plurality of wireless devices 126. However, these wireless links have been omitted for the sake of brevity.

Requesting device 120 and wireless devices 121-124 may be any device, system, combination of devices, or other such communication platform capable of communicating with base station 110 using multiple frequency bands. Requesting device 120 and wireless devices 121-124 may use communication aspects specified by the WiMAX specification including, but not limited to, the frequency bands, frames, and air-interface allocation units (slots) detailed therein. Requesting device 120 and wireless devices 121-124 may be, or comprise, for example, a mobile phone, a wireless phone, a wireless modem, a personal digital assistant (PDA), a voice over internet protocol (VoIP) phone, a voice over packet (VOP) phone, or a soft phone, as well as other types of devices or systems that can exchange data with base station 110 via multiple frequency bands. Other types of communication platforms are possible.

Base station 110 may be any wireless system that provides the air interface to requesting device 120 and wireless devices 121-124 using multiple frequency bands. Base station 110 may also use one or more transmitters. Base station 110 may also use one or more receivers. Base station 110 may be any wireless system that can provide an air interface to requesting device 120 and wireless devices 121-124. Base station 110 may use communication aspects specified by the WiMAX specification including, but not limited to, the frequency band, frames, and air-interface allocation units (slots) detailed therein. Examples of base stations that may be utilized include, base transceiver stations (BTSs), radio base stations (RBSs), Node B, enhanced Node B (eNBs) and others. Base stations may include a number of elements known to those skilled in the art comprising transceivers, power amplifiers, combiner, duplexer, and antennas. Base station 110 may also include other additional components such as a control function or control computer. However, these additional components have been omitted from FIG. 1 for the sake of brevity.

In an embodiment, the first plurality of wireless devices 125 is using a first frequency band. A frequency band may also be referred to as a channel. The second plurality of wireless devices 126 is using a second channel. The first plurality of wireless devices 125 may be associated with a first air-interface utilization. The second plurality of wireless devices may be associated with a second air-interface utilization. These air interface utilizations may correspond to the number of slots occupied per frame. These air-interface utilizations may correspond to the uplink utilization, the downlink utilization, or both. A slot corresponds to an allocation of time and frequency. The first and second air-interface utilizations may be expressed as a number between zero and one that corresponds to the number of occupied slots in a frame divided by the total number of available slots.

The first and second air-interface utilizations may be expressed as an average. For example, the average air-interface utilization at the end of frame number n+1($D_{n+1}$) may be computed as:

$$D_{n+1}=(1-f)D_n+fd_{n+1}$$

where: $D_n$ is the average utilization computed at the end of frame number n; $d_{n+1}$ is the fraction of occupied slots in frame number n+1; and, f is a window averaging factor. Similarly, air-interface utilizations associated with each individual of wireless devise 121-124 may be calculated. These individual air-interface utilizations may be expressed as an average. For example, the average air-interface utilization associated with wireless device number k at the end of frame number n+1 ($D_{n+1,k}$) may be computed as:

$$D_{n+1,k}=(1-f)D_{n,k}+fd_{n+1,k}$$

where: $D_{n,k}$ is the average utilization associated with wireless device k computed at the end of frame number n; $d_{n+1,k}$ is the fraction of occupied slots associated with wireless device k in frame number n+1; and, f is a window averaging factor.

The preceding two formulas converge on the average of air-interface utilization over a period of N frames. The number of frames, N, is dependent upon the window averaging factor f. It should be noted that f is a value greater than zero and less than or equal to one. Larger values of f (i.e., closer to one), correspond to smaller values of N. Smaller values of f (i.e., closer to zero), correspond to larger values of N.

In an embodiment, requesting device 120 may seek air-interface resources from base station 110. Requesting device 120 may seek these air-interface resources as a new wireless device becoming active, as an idle user becoming active, as part of an initial registration procedure, or due to a handoff from another base station (not shown). When requesting device 120 seeks air-interface resources, base station 110 may direct requesting device 120 to use a channel with the least air-interface utilization.

In an embodiment, when the first air-interface utilization satisfies a criteria, base station 110 may transfer one or more of the first plurality of wireless devices 125 to the second channel. For example, when the first air-interface utilization exceeds a threshold (e.g., 80% utilization), then base station 110 may control one or more of the first plurality of wireless devices 125 to use the second channel.

In an embodiment, base station 110 may select the wireless devices 121-122 to be transferred to the second channel such that the number of wireless devices 121-122 transferred is minimized. Base station 110 may also select the wireless devices 121-122 to be transferred such that the number of wireless devices transferred will result in the first channel and the second channel having approximately the same air-interface utilization.

In an embodiment, base station 110 may select the wireless devices 121-122 as follows: (1) the plurality of wireless device 125 are placed in decreasing order according to their average air-interface utilizations; and, (2) the top P wireless devices 121-122 are selected such that the average air-interface utilization due to the selected wireless devices is greater than one-half of the difference between the first average air-interface utilization and a second average air-interface utilization associated with the second channel. In other words, P devices (represented by wireless devices x, y and z) may be selected to minimize P and satisfy the formula:

$$D_x + D_y + \ldots + D_z \geq \frac{D_1 - D_2}{2}$$

where: $D_x \geq D_y \geq \ldots \geq D_z$, $D_1$ corresponds to the average air-interface associated with the first channel, and $D_2$ corresponds to the average air-interface associated with the second channel. Over time, this results in the air-interface utilization of the two channels converging to the average of the two air-interface utilizations.

It should also be understood that if the transfer of wireless devices 121-122 will result in the second channel satisfying a criteria, (e.g., 80% utilization) then base station 110 may elect not to transfer any of the plurality of wireless device 125 to the second channel. Base station 110 may apply this technique to a number of channels greater than two by selecting the channel with the lowest air-interface utilization to correspond to the second channel.

Figure 2:
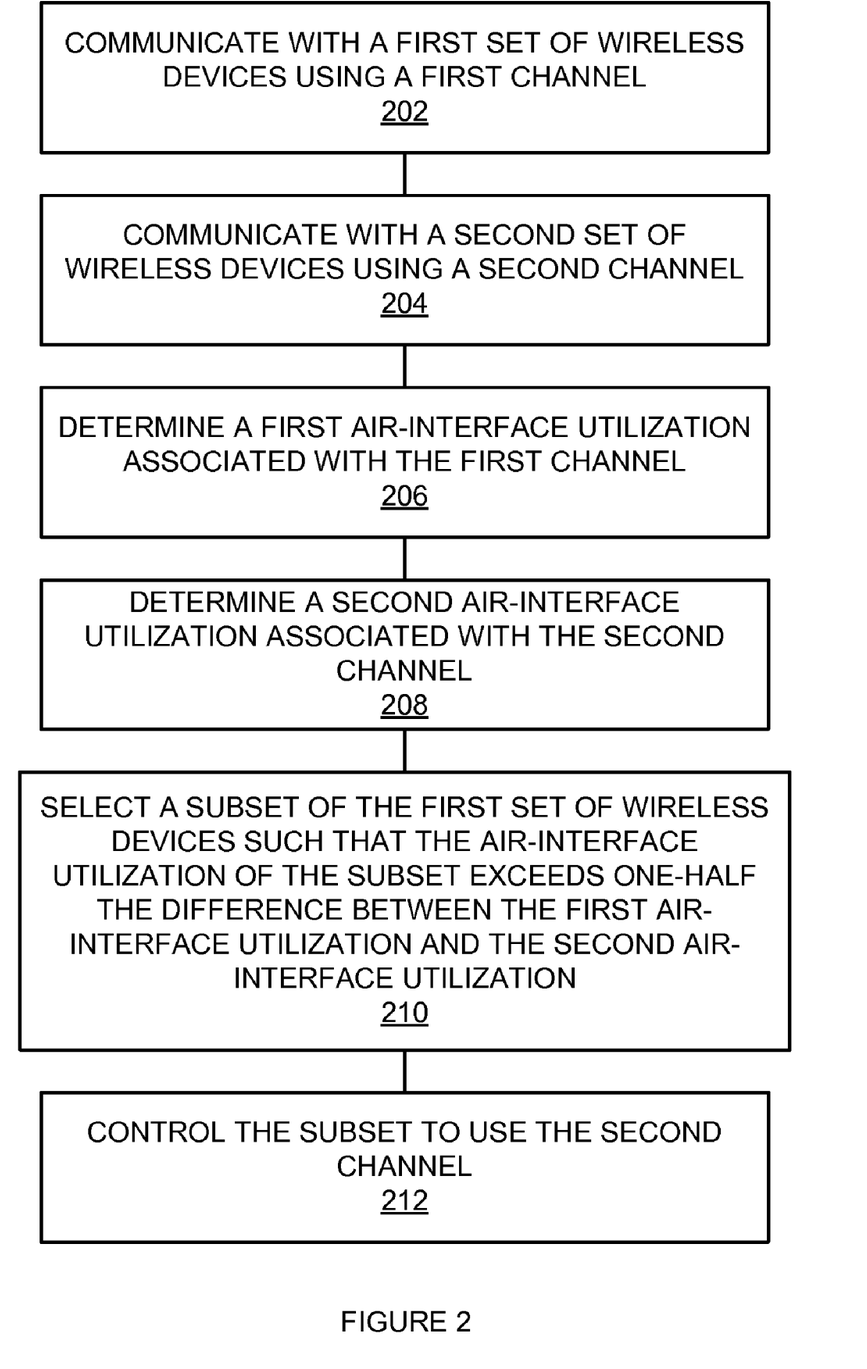
FIG. 2 is a flowchart illustrating a method of operating a communication system.

FIG. 2 is a flowchart illustrating a method of operating a communication system. The steps illustrated in FIG. 2 may be performed by one or more elements of communication system 100.

A first set of wireless devices are communicated with using a first channel (202). For example, communication system 100 may communicate with first plurality of wireless devices 125 using a first channel. A second set of wireless devices are communicated with using a second channel (204). For example, base station 100 may communicate with second plurality of wireless devices 126 using a second channel.

A first air-interface utilization associated with the first channel is determined (206). For example, communication system 100 may calculate an average air-interface utilization associated with the first channel at the end of each frame. The average air-interface utilization after frame number n+1 ($D_{n+1}$) may be computed as:

$$D_{n+1}=(1-f)D_n+fd_{n+1}$$

where: $D_n$ is the average air-interface utilization computed at the end of frame number n; the factor $d_{n+1}$ is the fraction of occupied slots in frame number n+1; and, the factor f is a window averaging factor. Similarly, air-interface utilizations associated with each individual of wireless device 121-124 of the first plurality of wireless devices may be calculated. These individual air-interface utilizations may be expressed as an average. For example, the average air-interface utilization associated with wireless device number k at the end of frame n+1 ($D_{n+1,k}$) may be computed as:

$$D_{n+1,k} = (1-f)D_{n,k} + fd_{n+1,k}$$

where: $D_{n,k}$ is the average utilization associated with wireless device k computed at the end of frame number n; the factor $d_{n+1,k}$ is the fraction of occupied slots to the total number of slots associated with wireless device k in frame number n+1; and, the factor f is a window averaging factor.

A second air-interface utilization associated with the second channel is determined (208). The second air-interface utilization associated with the second channel may be determined in the same or similar manner as block 206.

A subset of the first set of wireless devices is selected such that the air-interface utilization of the subset exceeds one-half the difference between the first air-interface utilization and the second air-interface utilization (210). For example, communication system 100 may select a subset of the plurality of wireless devices 125 as follows: (1) the plurality of wireless device 125 are placed in decreasing order according to their average air-interface utilizations; and, (2) the top P wireless devices are selected such that the average air-interface utilization due to the selected wireless devices is greater than one-half of the difference between the first average air-interface utilization and a second average air-interface utilization associated with the second channel. In other words, a subset of P devices (represented by wireless devices x, y and z) may be selected to minimize P and satisfy the formula:

$$D_x + D_y + \ldots + D_z \geq \frac{D_1 - D_2}{2}$$

where: $D_x \geq D_y \geq \ldots \geq D_z$, the factor $D_1$ corresponds to the average air-interface associated with the first channel, and the factor $D_2$ corresponds to the average air-interface associated with the second channel. Over time, this results in the air-interface utilization of the two channels converge to the average of the two air-interface utilizations.

The subset is controlled to use the second channel (212). For example, base station 110 may control the selected subset of P devices in first plurality of wireless devices 125 to use the second channel. This reduces the load on the first channel and increases the load on the second channel. Thus, the air-interface load between the first channel and the second channel is redistributed in a manner that tends to equalize the load on both channels.

Figure 3:
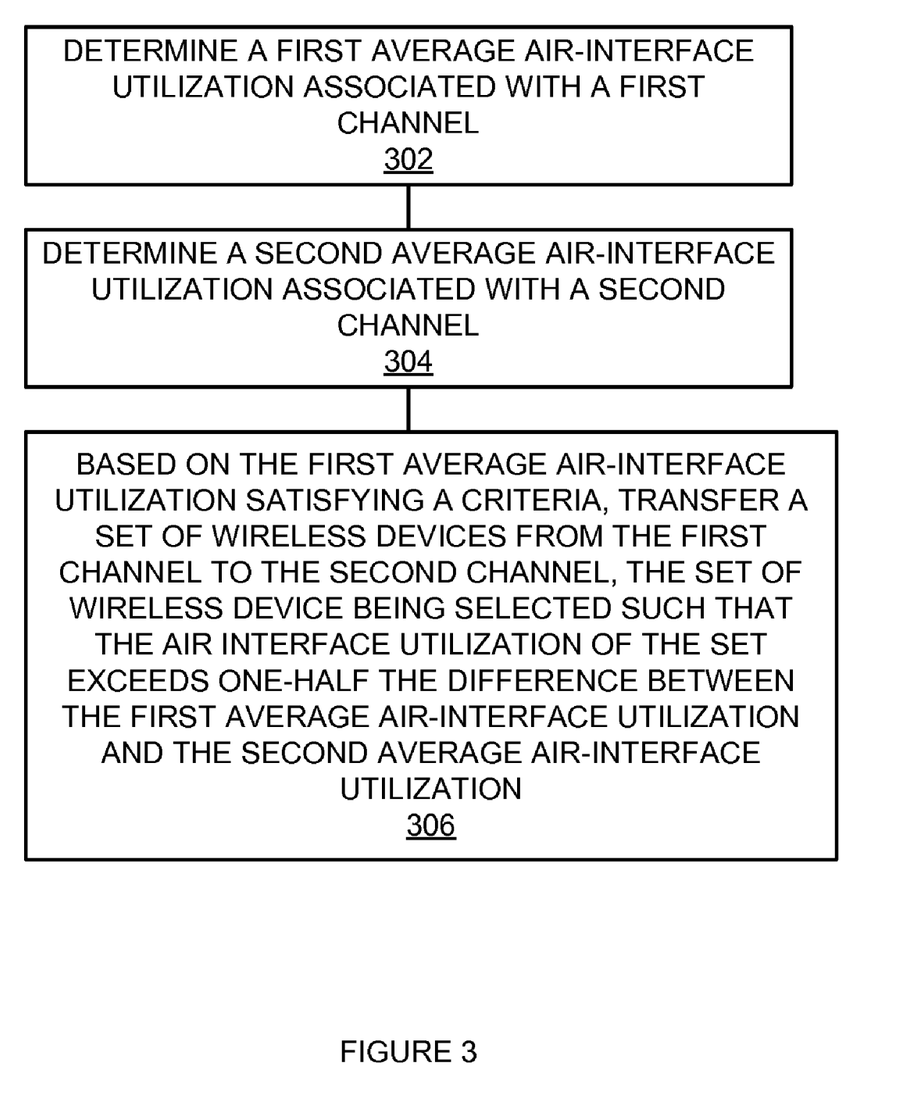
FIG. 3 is a flowchart illustrating a method of operating a communication system.

FIG. 3 is a flowchart illustrating a method of operating a communication system. The steps illustrated in FIG. 3 may be performed by one or more elements of communication system 100.

A first average air-interface utilization associated with a first channel is determined (302). For example, base station 110 may determine an average air-interface utilization associated with the first channel. Base station 110 may determine this average air-interface utilization in a manner described previously. A second average air-interface utilization associated with a second channel is determined (304). For example, base station 110 may determine an average air-interface utilization associated with the second channel. Base station 110 may determine this average air-interface utilization in a manner described previously.

Based on the first average air-interface utilization satisfying a criteria, a set of wireless devices are transferred from the first channel to the second channel (306). The set of wireless devices may be selected such that the air-interface utilization of the set exceeds one-half the difference between the first average air-interface utilization and the second average air-interface utilization (306). For example, base station 110 may transfer a subset of the first plurality of wireless devices 125 to the second channel based upon the aggregate air-interface utilization on the first channel exceeding a threshold (e.g., 80%). Base station 110 may select the subset in a manner described previously.

Figure 4:
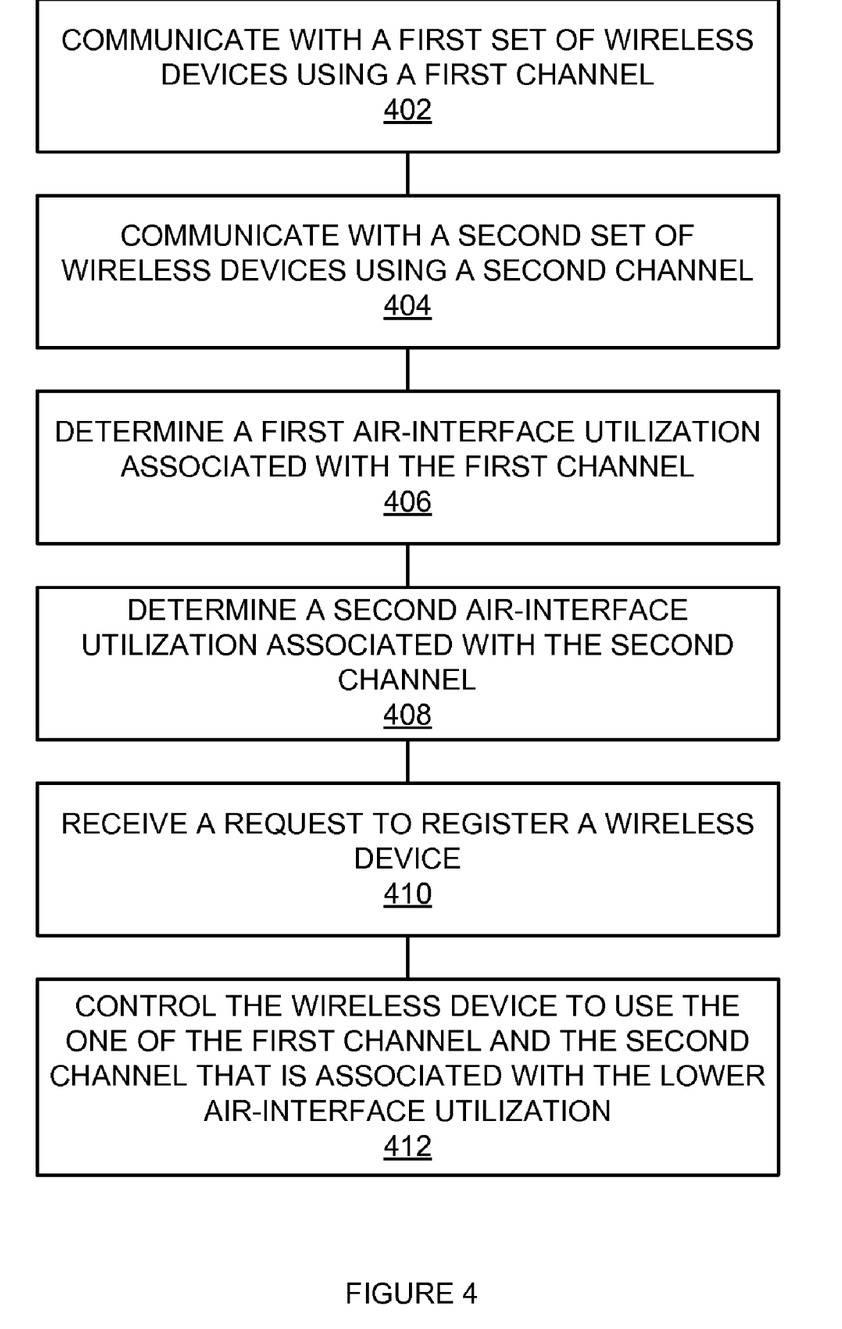
FIG. 4 is a flowchart illustrating a method of selecting a channel for a registering device.

FIG. 4 is a flowchart illustrating a method of selecting a channel for a registering device. The steps illustrated in FIG. 4 may be performed by one or more elements of communication system 100.

A first set of wireless devices are communicated with using a first channel (402). For example, communication system 100 may communicate with first plurality of wireless devices 125 using a first channel. A second set of wireless devices are communicated with using a second channel (404). For example, base station 100 may communicate with second plurality of wireless devices 126 using a second channel.

A first air-interface utilization associated with the first channel is determined (406). For example, communication system 100 may calculate an average air-interface utilization associated with the first channel at the end of each frame. The average air-interface utilization after each frame number may be computed in a manner described previously.

A second air-interface utilization associated with the second channel is determined (408). The second air-interface utilization associated with the second channel may be determined in the same or similar manner as block 406.

A request to register a wireless device is received (410). For example, base station 110 may receive a request from requesting device 120. Requesting device 120 may seek to be registered for air-interface resources as a result of requesting device 120 becoming active, as requesting device 120 goes from an idle state to becoming active, as part of an initial registration procedure associated with requesting device 120, or due to a handoff of requesting device 120 from another base station (not shown) to base station 110.

The wireless device is controlled to use the one of the first channel and the second channel that is associated with the lower air-interface utilization (412). For example, base station 110 may direct requesting device 120 to use the channel with the least air-interface utilization.

The methods, systems, devices, and base stations described above may be implemented with, contain, or be executed by one or more computer systems. The methods described above may also be stored on a computer readable medium. Many of the elements of communication system 100 may be, comprise, or include computers systems. This includes, but is not limited to: communication system 100, base station 110, requesting device 120, and wireless devices 121-124.

Figure 5:
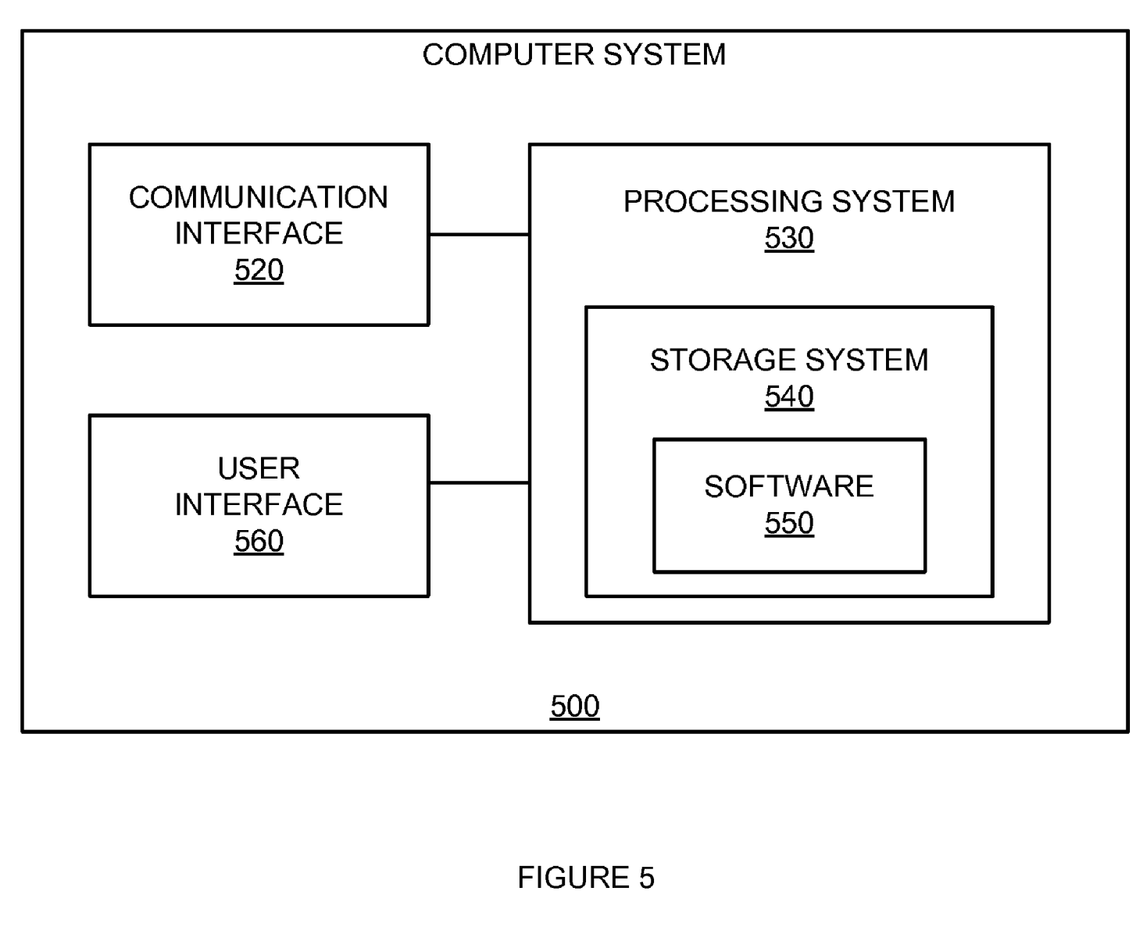
FIG. 5 is a block diagram of a computer system.

FIG. 5 illustrates a block diagram of a computer system. Computer system 500 includes communication interface 520, processing system 530, and user interface 560. Processing system 530 includes storage system 540. Storage system 540 stores software 550. Processing system 530 is linked to communication interface 520 and user interface 560. Computer system 500 could be comprised of a programmed general-purpose computer, although those skilled in the art will appreciate that programmable or special purpose circuitry and equipment may be used. Computer system 500 may be distributed among multiple devices that together comprise elements 520-560.

Communication interface 520 could comprise a network interface, modem, port, transceiver, or some other communication device. Communication interface 520 may be distributed among multiple communication devices. Processing system 530 could comprise a computer microprocessor, logic circuit, or some other processing device. Processing system 530 may be distributed among multiple processing devices. User interface 560 could comprise a keyboard, mouse, voice recognition interface, microphone and speakers, graphical display, touch screen, or some other type of user device. User interface 560 may be distributed among multiple user devices. Storage system 540 could comprise a disk, tape, integrated circuit, server, or some other memory device. Storage system 540 may be distributed among multiple memory devices.

Processing system 530 retrieves and executes software 550 from storage system 540. Software 550 may comprise an operating system, utilities, drivers, networking software, and other software typically loaded onto a computer system. Software 550 could comprise an application program, firmware, or some other form of machine-readable processing instructions. When executed by processing system 530, software 550 directs processing system 530 to operate as described herein.

The above description and associated figures teach the best mode of the invention. The following claims specify the scope of the invention. Note that some aspects of the best mode may not fall within the scope of the invention as specified by the claims. Those skilled in the art will appreciate that the features described above can be combined in various ways to form multiple variations of the invention. As a result, the invention is not limited to the specific embodiments described above, but only by the following claims and their equivalents.

What is claimed is:

1. A method of operating a communication system, comprising:
    communicating with a first set of wireless devices using a first frequency range;
    communicating with a second set of wireless devices using a second frequency range;
    determining a first air-interface utilization associated with the first frequency range;
    determining that the first air-interface utilization satisfies a criteria;
    determining a second air-interface utilization associated with the second frequency range;
    selecting a subset of the first set of wireless devices, the subset having a total air interface utilization that exceeds one-half of the difference between the first air-interface utilization and the second air-interface utilization;
    wherein the first air-interface utilization and the second air-interface utilization are based on a weighted series of individual frame air-interface utilizations, wherein the weighted series of individual frame air-interface utilizations is based on a formula equivalent to:

$$D_{n+1}=(1-f)D_n+fd_{n+1}$$

wherein $D_n$ corresponds to average utilization computed at the end of frame number n, $d_{n+1}$ is fraction of occupied slots in frame number n+1 and f is a window averaging factor greater than zero and less than one; and,
    controlling the subset to use the second frequency range.

2. The method of claim 1, wherein the subset of the first set of wireless devices is selected from the first set of wireless devices to minimize the number of wireless devices in the subset.

3. The method of claim 1, further comprising:
    controlling a wireless device that is registering to use a one of the first frequency range and the second frequency range associated with a least amount of air-interface utilization.

4. The method of claim 3, wherein the least amount of air-interface utilization is associated with downlink air-interface utilization.

5. The method of claim 3, wherein the wireless device is registering due to a handoff.

6. The method of claim 3, wherein the wireless device is registering due to becoming active.

7. A method of operating a communication system, comprising:
    determining a first average air-interface utilization associated with a first channel;
    determining the first average air-interface utilization satisfies a criteria;
    based on the first average air-interface utilization satisfying the criteria, transferring a set of wireless devices from the first channel to a second channel, the set of wireless devices being selected such that a transferring average air-interface utilization due to the set of wireless devices is greater than one-half of the difference between the first average air-interface utilization and a second average air-interface utilization associated with the second channel,
    wherein the first average air-interface utilization is based on a weighted series of individual frame air-interface utilizations and wherein the weighted series of individual frame air-interface utilizations is based on a formula equivalent to:

$$D_{n+1}=(1-f)D_n+fd_{n+1}$$

wherein $D_n$ corresponds to average utilization computed at the end of frame number n, $d_{n+1}$ is fraction of occupied slots in frame number n+1 and f is a window averaging factor greater than zero and less than one.

8. The method of claim 7, wherein the set of wireless devices is selected to minimize the number of wireless devices transferred.

9. The method of claim 7, wherein the second channel is selected from a plurality of channels as a channel with a lowest average air-interface utilization among the plurality of channels.

10. The method of claim 9, further comprising:
    registering a wireless device on the second channel.

11. The method of claim 10, wherein the wireless device is registering due to a handoff.

12. The method of claim 9, wherein the lowest average of air-interface utilization among the plurality of channels is associated with downlink air-interface utilization.

13. A non-transitory computer readable medium having instructions stored thereon for balancing air-interface utilization among a plurality of channels that, when executed by a computer, at least instruct the computer to:
    determine a first average air-interface utilization associated with a first channel;
    determine the first average air-interface utilization satisfies a criteria;
    based on the first average air-interface utilization satisfying the criteria, transfer a set of wireless devices from the first channel to a second channel, the set of wireless devices being selected such that a transferring average air-interface utilization due to the set of wireless devices is greater than one-half of the difference between the first average air-interface utilization and a second average air-interface utilization associated with the second channel,
wherein the first average air-interface utilization is based on a weighted series of individual frame air-interface utilizations and wherein the weighted series of individual frame air-interface utilizations is based on a formula equivalent to:

$$D_{n+1}=(1-f)D_n+fd_{n+1}$$

wherein $D_n$ corresponds to average utilization computed at the end of frame number n, $d_{n+1}$ is fraction of occupied slots in frame number n+1 and f is a window averaging factor greater than zero and less than one.

14. The computer readable medium of claim 13, wherein the set of wireless devices is selected to minimize the number of wireless devices transferred.

15. The computer readable medium of claim 13, wherein the second channel is selected from the plurality of channels as a channel with a lowest average air-interface utilization among the plurality of channels.

* * * * *